CHAS E. GOODWIN
IMPROVED FARM-GATE
74529 PATENTED FEB 18 1868
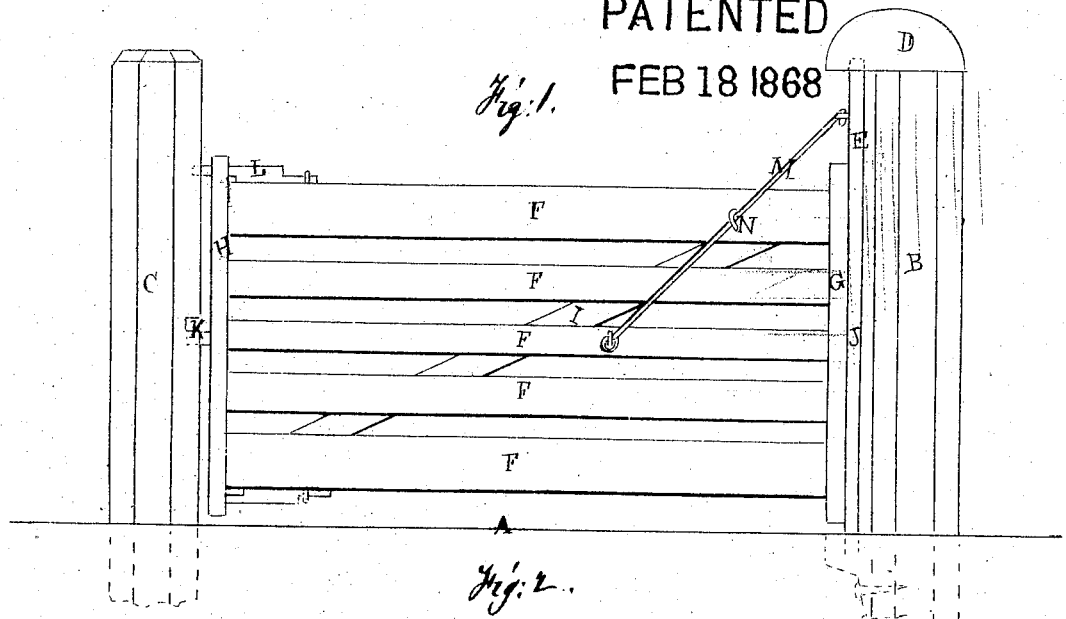
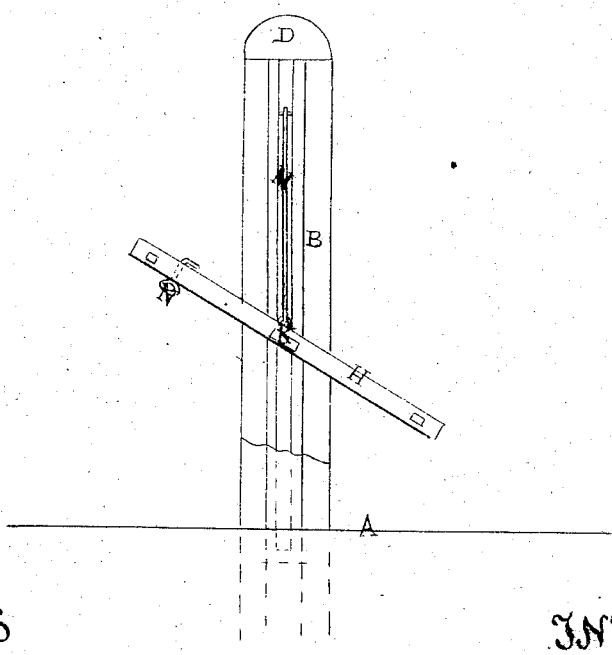
WITNESSES
INVENTOR

United States Patent Office.

CHARLES EUGENE GOODWIN, OF PORTLAND, MICHIGAN.

Letters Patent No. 74,529, dated February 18, 1868.

IMPROVEMENT IN FARM-GATES.

The Schedule referred to in these Letters Patent and making part of the same.

Know all men that I, CHARLES EUGENE GOODWIN, of Portland, in the county of Ionia, and State of Michigan, have invented a new and useful Improvement in Farm-Gates; and I do declare that the following is a true and accurate description thereof, reference being had to the accompanying drawings, and to the letters of reference marked thereon, and being a part of this specification.

The object of this invention is to construct a compact, strong, durable, economical farm-gate, that can be operated in all weathers, combining simplicity with convenience, and one by which sheep, hogs, and other small animals, can be allowed to pass, while the large animals, like horses and cattle, will be stopped. The construction of this gate is so simple that almost any one can make and set it up, as it can be made nearly entirely of wood.

A represents the ground, into which are set, at proper distances apart, the posts B and C, the post B being provided with a projecting cap, D, into which is let the pivot-post or bar E, the other end of which works in a proper step, which may be set in the ground or attached to the bottom of the post B. I now, having prepared and set the posts, build my gate of as many horizontal bars, F, as may be necessary or convenient, the ends of the bars F being attached to the stiles G and H by mortising or other proper device. The whole may be strengthened by the brace I. The centre horizontal bar F should be mortised through the stiles, and be allowed to project far enough beyond them so that the pivot-pins may be formed from the ends thus projecting. One of these pivot-pins, J, should be entered into a proper circular hole in the pivot-post E, while the pivot-pin K drops into a proper slot in the post C. The top and bottom horizontal bars F should each be provided with a bolt, L, fitting holes bored in the post C, to hold the gate in an upright position. To attach the gate to the pivot-post E, I use the rod or chain M, one end of which is fastened near the top of the pivot-post, while the other end is attached to the centre horizontal bar F by any suitable joint.

By drawing the bolts L the gate may be opened and closed as ordinary gates are done. When I do not wish to open the gate, but simply to turn it to allow small animals to pass under, I draw the bolts L, and pull or push the top of the gate, when it assumes a horizontal position, as shown in fig. 2, when the smaller animals may pass through, while the larger ones will be stopped. By pushing it half over, and swinging it round, and then turning it the other side up, it can be opened in the deepest snows.

N is a revolving catch, attached to the top horizontal bar F, to hold the gate firmly to the rod or chain M when required.

Figure 1 is a plan or front view of my invention.

Figure 2 is a front view of the same, partially open for the passage of small animals.

The same letters indicate like parts in each figure.

What I claim as my invention, and desire to secure by Letters Patent, is—

The construction of a gate as herein described, with the posts B and C, the projecting cap D, the pivot-post E, the horizontal bars F, the stiles G and H, the brace I, the pivot-pins K, the bolts L, the rod or chain M, and the revolving catch N, when arranged and operating substantially as and for the purposes set forth.

C. E. GOODWIN.

Witnesses:
 G. E. PRESTON,
 LOVEL HALLADAY.